C. G. MORTIMER.
DEVICE FOR AUTOMATICALLY MOISTENING AND SERVING STRIPS OF TAPE.
APPLICATION FILED MAY 13, 1914.
1,271,603.
Patented July 9, 1918.
5 SHEETS—SHEET 1.
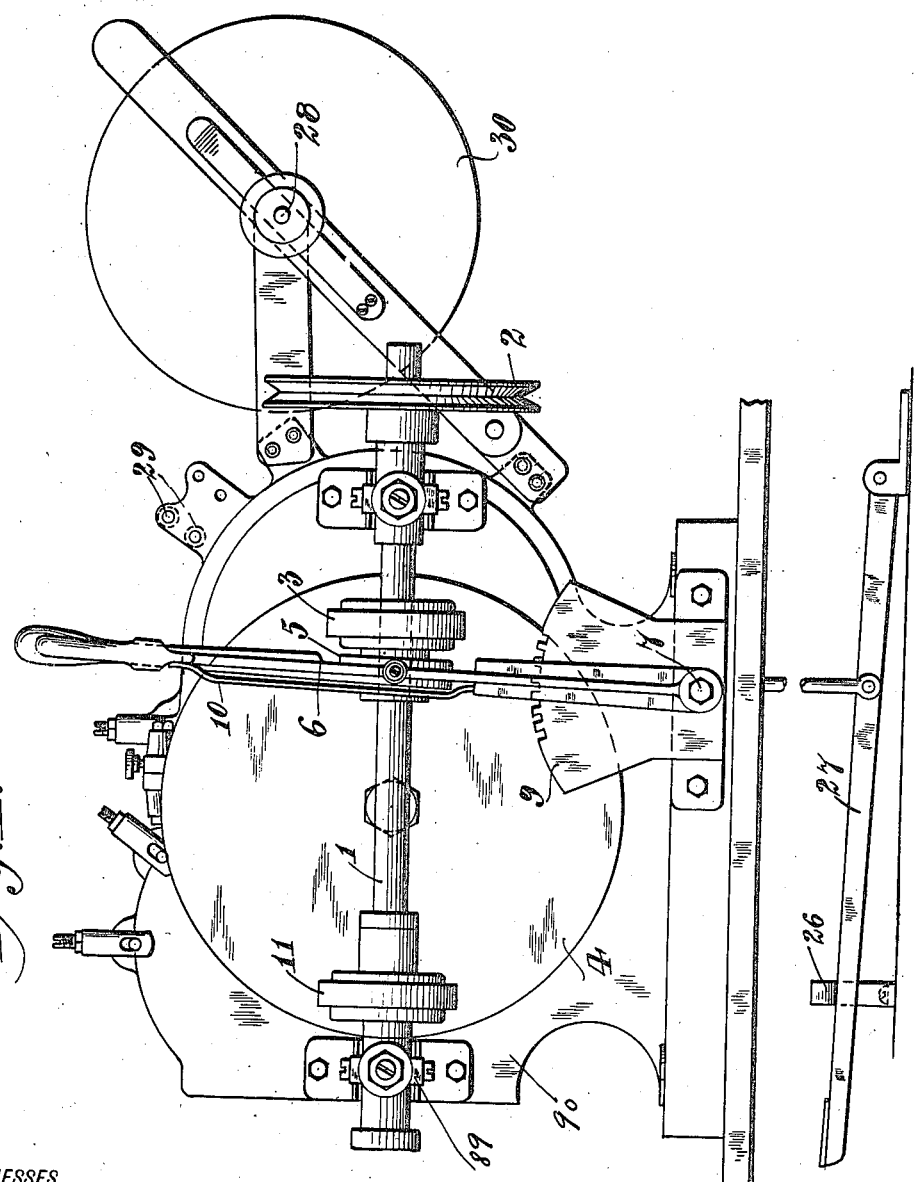

C. G. MORTIMER.
DEVICE FOR AUTOMATICALLY MOISTENING AND SERVING STRIPS OF TAPE.
APPLICATION FILED MAY 13, 1914.
1,271,603.
Patented July 9, 1918.
5 SHEETS—SHEET 2.
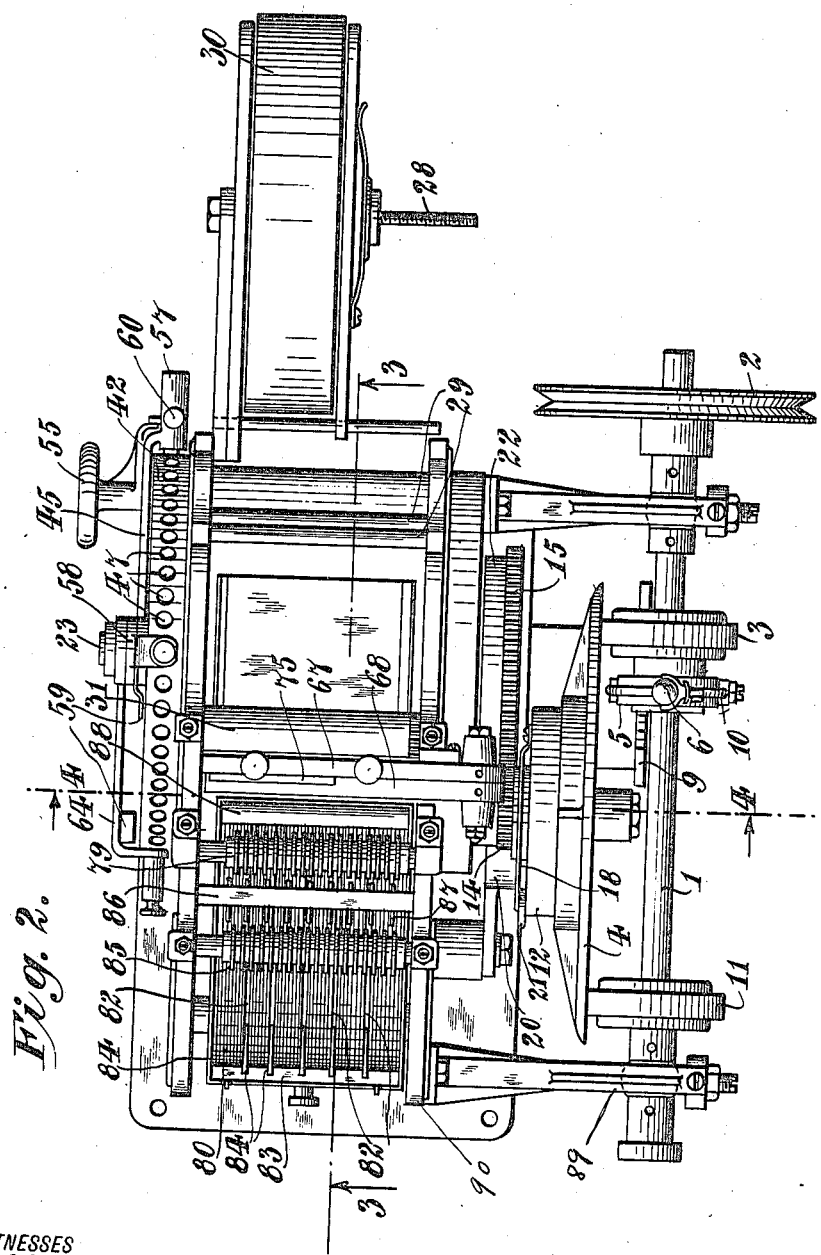
WITNESSES
INVENTOR
Charles G. Mortimer
BY
his ATTORNEYS C. G. MORTIMER.
DEVICE FOR AUTOMATICALLY MOISTENING AND SERVING STRIPS OF TAPE.
APPLICATION FILED MAY 13, 1914.
1,271,603.
Patented July 9, 1918.
5 SHEETS—SHEET 3.
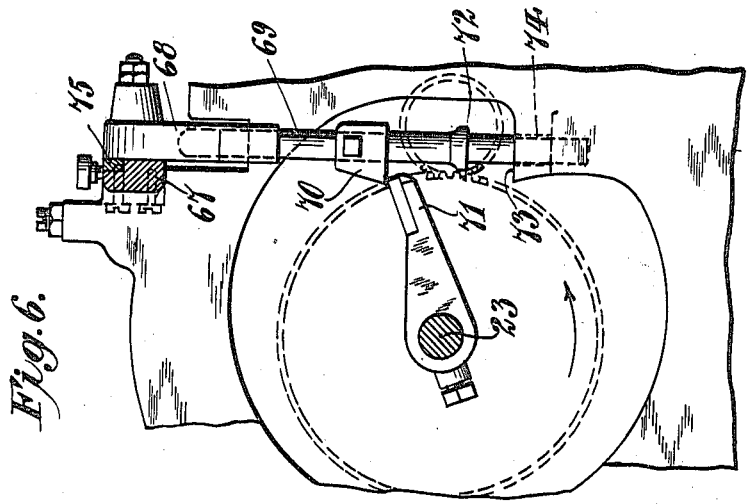
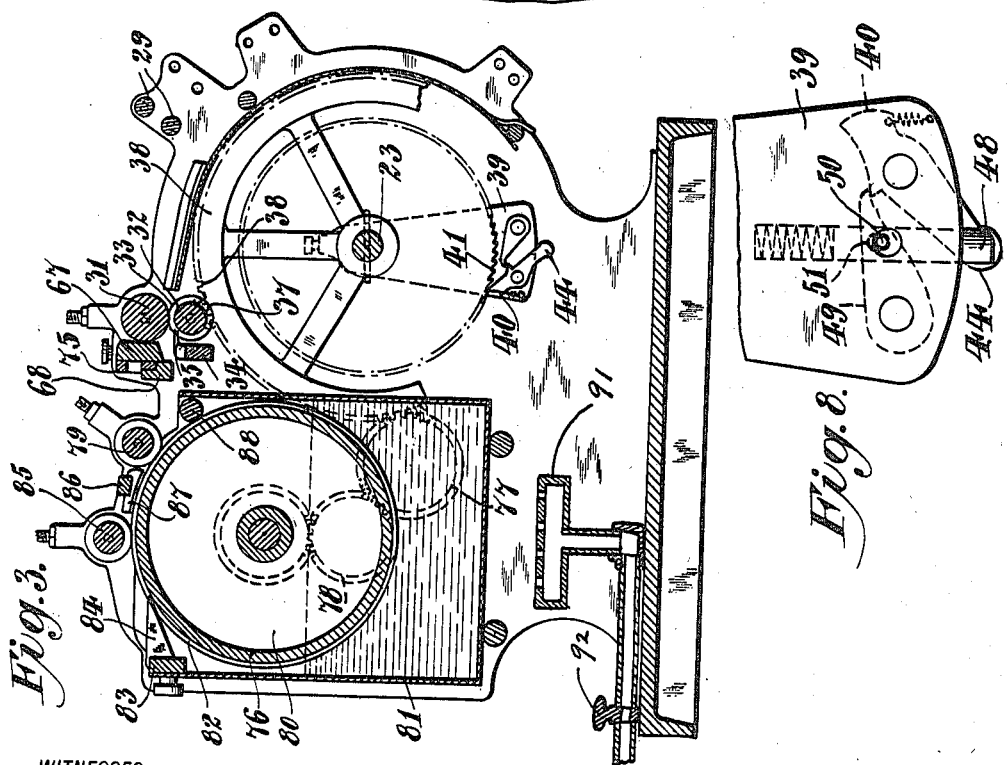
WITNESSES
INVENTOR
Charles G. Mortimer
BY
his ATTORNEYS

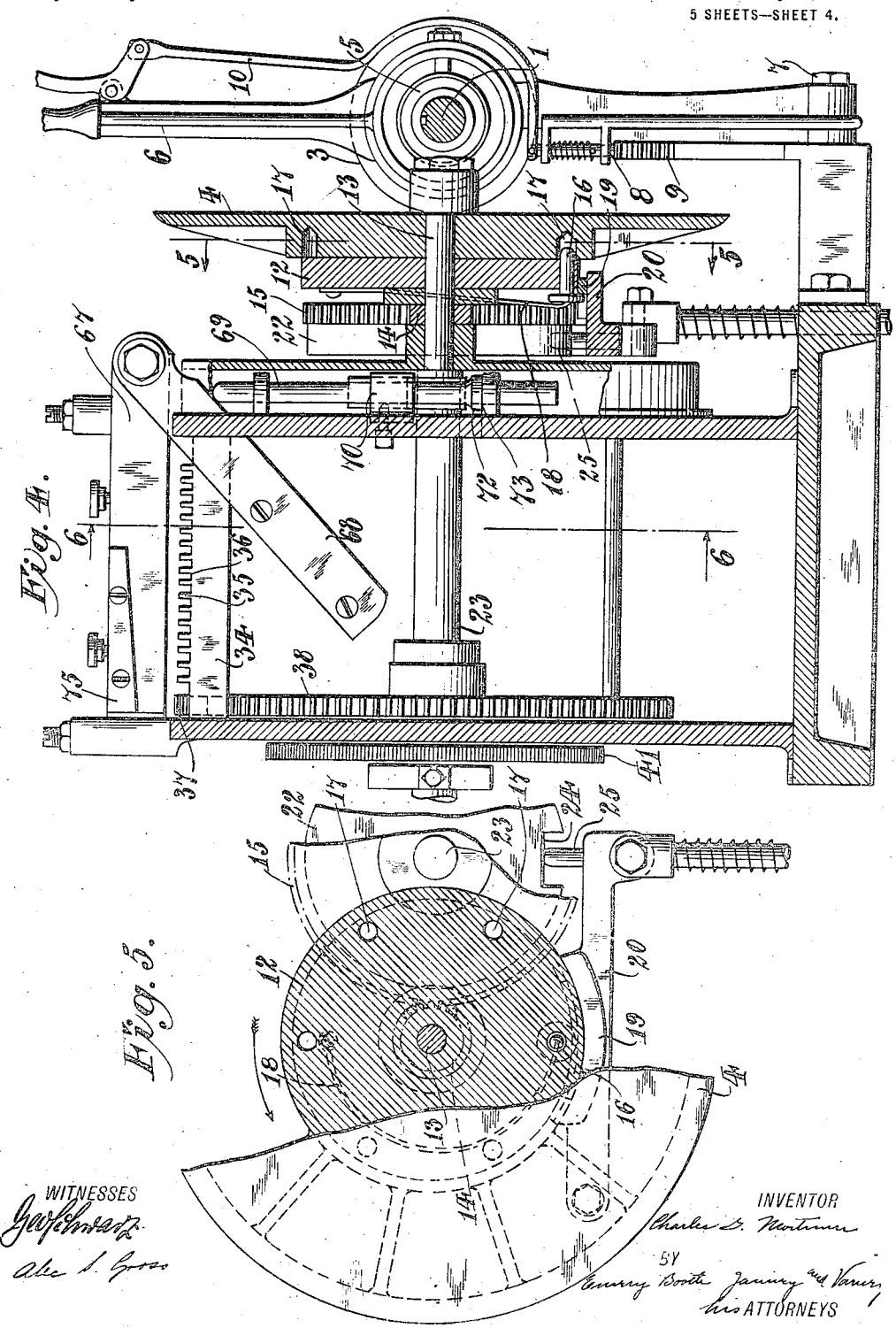

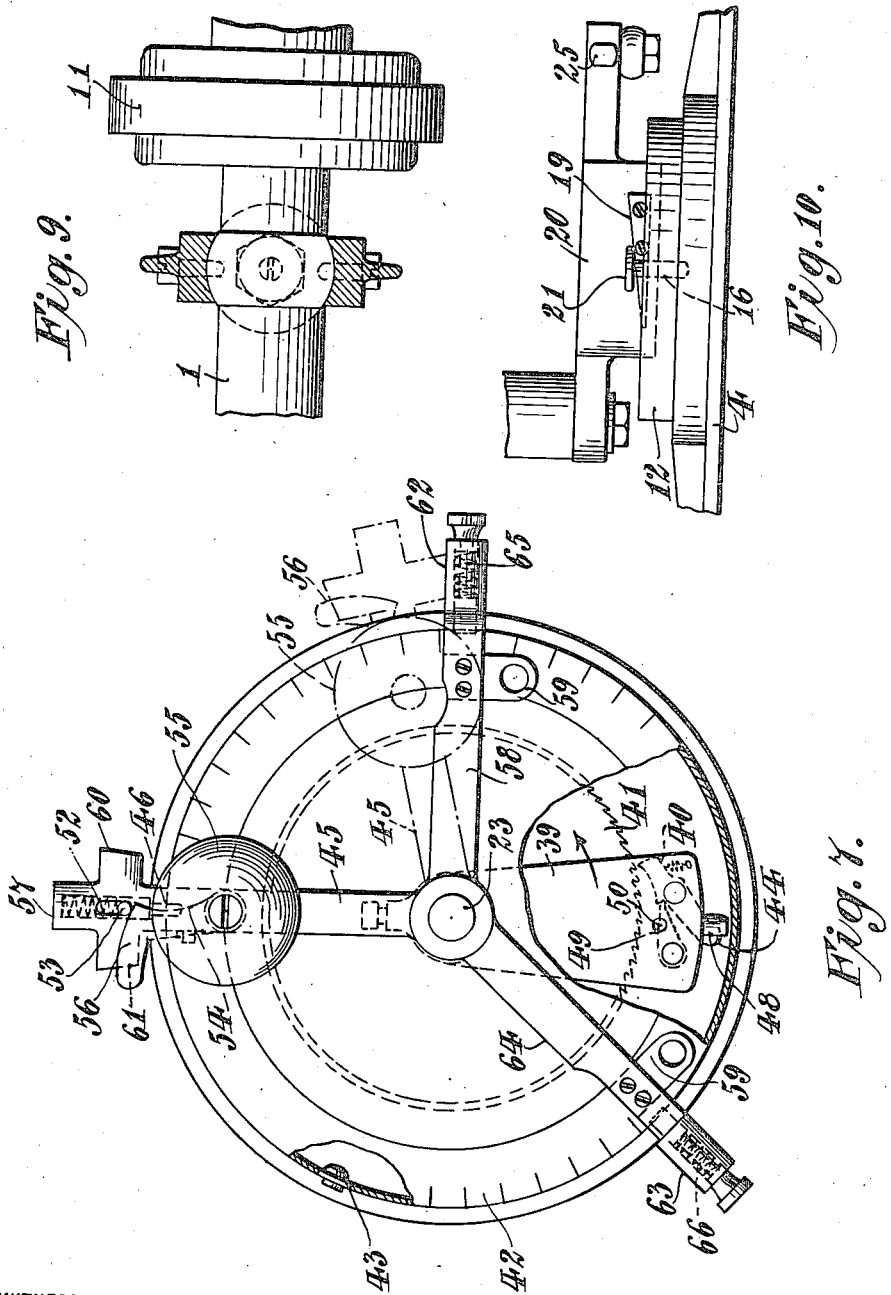

UNITED STATES PATENT OFFICE.

CHARLES G. MORTIMER, OF EAST ORANGE, NEW JERSEY, ASSIGNOR TO NATIONAL BINDING MACHINE COMPANY, OF NEW YORK, N. Y., A CORPORATION OF NEW YORK.

DEVICE FOR AUTOMATICALLY MOISTENING AND SERVING STRIPS OF TAPE.

1,271,603.          Specification of Letters Patent.       Patented July 9, 1918.

Application filed May 13, 1914. Serial No. 838,197.

*To all whom it may concern:*

Be it known that I, CHARLES G. MORTIMER, citizen of the United States, and resident of East Orange, Essex county, State of New Jersey, have invented an Improvement in Devices for Automatically Moistening and Serving Strips of Tape, of which the following description, in connection with the accompanying drawings, is a specification, like letters on the drawings representing like parts.

The present invention relates to strip serving devices, particularly those of the automatic type. The object is to provide an improved apparatus and one in which certain features are directed to serving strips of tape of various lengths automatically in adhesive condition ready for application.

One embodiment of my invention is illustrated in the drawings which accompany this specification in which, Figure 1 is a rear elevation of a machine illustrating my invention, Fig. 2, a top view thereof, Fig. 3, a central longitudinal section on the line 3—3, Fig. 2, Fig. 4, a vertical cross section on the line 4—4, Fig. 2, Fig. 5, a section on the line 5—5 of Fig. 4, Fig. 6, a detail of the knife operating mechanism, Fig. 7, a detail of the mechanism for regulating the strip length, Fig. 8, a detail of the pawl carrying arm attached to the main shaft, Fig. 9, a detail of the change speed friction drive, and Fig. 10 is a detail of the wedge carrying lever arm associated with the clutch mechanism.

The particular strip serving device illustrated in the accompanying drawings to show one embodiment of my invention provides an apparatus which automatically feeds, severs and moistens strips of tape of various lengths, delivering them so that they may readily be put to any desired use, such for example, as sealing packages; but obviously my invention is not restricted to a machine containing all such features. It is contemplated that the apparatus shown shall be power driven and so constructed that it may be operated at any required speed within a wide range. Provision has also been made in the present device for arresting operation of the tape handling mechanism without shutting off the power.

Referring now to Fig. 1 of the drawings, power is applied to the driving shaft 1, journaled in suitable bearings 89 in the frame 90, by means of a pulley 2, and is in turn transmitted to the main shaft of the tape handling apparatus through a change speed friction drive comprising a friction gear 3 adapted to engage a friction disk 4 journaled on a stud 13 and a grooved collar 5 mounted on the driving shaft to rotate therewith and with the friction gear 3. A shift handle 6 pivoted at 7 in the frame work of the machine is operatively connected with said collar and provided with suitable locking mechanism including a pawl 8 coöperating with a ratchet 9 and a spring pressed controlling rod 10. It will be readily understood that the speed at which the friction disk is driven may be varied by causing the friction gear to engage it at different distances from the center. An idler 11 loosely mounted on the driving shaft 1 bears against the friction disk to compensate for the pressure of the driving friction gear 3.

In Figs. 2, 5, and 10, the clutch mechanism referred to above is illustrated, both in detail and in its relation to the entire machine. It comprises the friction disk 4 already referred to, a collar 12 loosely mounted on the stud 13, which also carries the friction disk 4, and means for connecting and disconnecting the friction disk and the collar 12. Inasmuch as this collar is also provided with a gear 14, which meshes with a gear 15 on the main shaft, the tape handling mechanism will be operated when the collar 12 and the friction disk 4 are connected. This connection is effected by means of a headed pin 16 extending through the collar 12 and adapted to engage one of a number of similarly shaped recesses 17 in the rear face of the friction disk. A spring 18 is provided to bear against the pin 16 in such a manner that the latter is normally pressed in the direction of the friction disk so as to engage one of the aforesaid recesses unless it is positively withheld therefrom. When the machine is in operation, this pin may be withdrawn from the recesses in the disk by means of a wedge 19 suitably mounted on a lever arm 20 pivoted in the frame work of the machine adjacent to the collar 12 so that the narrow end of the wedge will lie in the path of the rotating pin 16 to engage the head 21 thereof, and withdraw the pin from engagement with the recesses in the disk. In order that this feature of the operation of the clutch may be properly timed with reference to the tape handling mechanism, I provide a smooth collar 22 adapted to rotate with the gear 15 on the main shaft 23 (Fig. 5). This collar has a notch 24 to receive a projecting lug 25 mounted on the wedge carrying lever arm 20. The action of this lever arm 20 may be controlled in any suitable manner, but I have provided a treadle and lever mechanism whereby the wedge is held normally by spring pressure in the path of the rotating collar, which ceases to operate as soon as the pin is withdrawn from connection with the friction disk, and whereby the lug 25 is held normally against the periphery of the collar 22 so as to drop into the notch 24 unless restrained. This is accomplished by means of a latch 26, indicated in Fig. 1, which is suitably mounted to engage a treadle lever 27 and hold it against spring pressure in its lowermost position so that the lug 25 does not contact with the smooth collar 22.

To release the pin from the wedge 19 for the purpose of causing the tape handling machinery to operate, the operator presses down upon the treadle lever 27, whereupon the pin is forced by pressure of the spring 18 into engagement with one of the recesses 17 in the disk. From the foregoing, it will be understood that the machine which I have illustrated may be thrown into and out of operation by a simple treadle operated mechanism and further, that the speed of the operating parts may be accurately controlled by means of a change speed apparatus, such as that heretofore described.
The tape feeding, tape severing, and tape moistening elements of the device are operated through suitable connections geared with the main shaft 23 (Fig. 3). A supply of tape 30 in the form of a roll may be supported upon a spindle 28, or other suitable means. The web of the tape is led between guides 29 to a pair of feeding rollers 31 and 32 (Fig. 3), the roller 32 being provided with peripheral flanges 33 to reduce to a minimum the possibility of the tape adhering thereto. Adjacent to the roller 32 which contacts with the gummed side of the tape, I have provided a bar 34 having on its upper edge a series of alternate projections 35 and indentations 36 (Fig. 4). As thus located, with reference to the feeding roller 32, it serves both as a stripper to remove tape which has adhered thereto and also to guide the tape from the feeding rollers to the severing apparatus, the said feeding rollers being positively driven by means of gears 37 and 38, the latter being loosely mounted on the main shaft 23. The moistening roller, to be described hereinafter is also similarly driven from the main shaft and in synchronism with the feeding rollers.

The length of strip to be severed by the present device is measured by the extent of operation of the feeding rollers. In order that strips of different lengths may be served, I have provided means whereby the duration of operation of the feeding rollers may be varied, the said means comprising an arm 39 (Fig. 3) attached to the main shaft 23 and adapted to carry a spring actuated pawl 40, and a ratchet wheel 41 attached to a collar which is loosely mounted on the main shaft 23 and which also carries the gear wheel 38, the said gear wheel being operatively connected with the feeding roller 32 through the gear 37 as described above. Referring now to Figs. 7 and 8 of the drawings, the pawl carrying arm 39 is inclosed within a dial casing 42, the latter being provided with a fixed lug 43 projecting inwardly so as to engage the cam shaped free end 44 of the pawl 40, thus disconnecting the said pawl from the ratchet wheel 41, the parts being in the position shown in dotted lines in Fig. 7, the pawl carrying arm 39 moving in the direction of the arrow. An adjustable trip carrying arm 45 is loosely mounted on the main shaft 23 and is adapted to carry a spring pressed trip 46 normally extending inwardly through perforations 47 (Fig. 2) in the dial casing as hereinafter described and designed to engage a spring pressed plunger 48 mounted in the pawl carrying arm. This plunger 48 is associated with a trigger member 49, suitably positioned on the arm 39 so as to engage the pawl 40 and hold the latter out of engagement with the ratchet 41 after the pawl has been tripped by the fixed lug 43. However, when the pawl carrying arm reaches the movable trip 46, and the latter engages the protruding end of the plunger 48, said plunger is pressed inwardly and thereupon acts upon the trigger 49 to detach the latter from engagement with the pawl thus releasing the same so that it may engage the ratchet wheel 41. The connection between the plunger 48 and the trigger 49 is effected by means of a pin 50 projecting from the plunger 48 so as to engage a corresponding slot 51 in the trigger. Thus it will be understood that when the plunger 48 is depressed by the movable trip 46, as just described, the pin 50 will press upon the side of the slot 51 to depress the trigger.

As pointed out above, the arm 45 is adapted to carry the trip 46 and is adjustable around the circumference of the dial casing 42. This arm 45 is further provided with a longitudinally extending slot 52 which engages a laterally extending lug 53 on the trip member 46, adapted to engage the cam shaped portion of a lever arm 54 pivoted on the trip carrying arm, the said lever arm 54 being rotatable by means of a knob 55. Thus it will be understood that when the operator wishes to adjust the machine to feed a given length of strip, he releases the arm 45 by partially rotating the knob 55 against spring pressure so that the cam shaped portion 56 of the lever arm 54 will bear outwardly against the lug 53 to force the trip member 46 out of engagement with one of the perforations 41 in the dial casing 42.

When the trip member is thus raised, the trip carrying arm 45 may be swung around to the position on the dial indicating the desired length of tape strip and, upon the release of the arm 54 by the operator, the trip member 56 will be forced by pressure of a spring 57 into engagement with the proper perforation in the periphery of the dial casing.

It has been found desirable to provide, in a machine of this character, mechanism for serving alternately strips of two different lengths. That is, for example, it might be desirable in sealing a box of certain dimensions that one strip be six inches long and the other strip be fifteen inches long. In order that the necessary shifting of the strip length adjusting mechanism may be effected as quickly as possible, indicator stops have been provided. These stops are set at positions on the dial indicating the two desired lengths of strip, and, as shown in Fig. 7, they comprise arms 58 and 64 respectively mounted on the main shaft 23, having a pointer 59 which, with the figures on the dial casing, indicates to the operator the length of strip which the machine will serve when the strip carrying arm 45 is positioned in proper relation thereto. As shown in Fig. 7 this arm 45 is provided with lateral extensions 60 and 61 which are adapted to contact with the faces 62 and 63 of the arms 58 and 64 respectively. Thus, when the extension 60 contacts with the face 62 on the arm 58, the machine will serve the strip of the length indicated by the pointer 59. The result is similar with respect to the operation of the arm 64 and the extension 61.

It will be understood, therefore, that the two lengths of tape may be served alternately by swinging the movable trip alternately against the two stops. It is contemplated that the provision of the stops permits more rapid operation than if the operator were compelled to select the desired position on the dial at each change. The arms 58 and 64 are provided with spring pressed pins 65 and 66 suitably shaped to fit the perforations 47 in the periphery of the dial casing.

After the tape feeding rollers have operated to draw out a strip of predetermined length by means of the mechanism hereinabove described, the web of tape is severed by cutting means operated from the main shaft. Referring now to Figs. 4 and 6, a fixed blade 67 is mounted in front of and adjacent to the feeding roller 31. A swinging blade 68 is pivoted so that its cutting edge will coöperate with the cutting edge of the fixed blade to sever the tape strip. To actuate the movable blade, I have provided a vertically slidable rod 69, (Fig. 6) having a projecting lug 70 adapted to be engaged by a cam 71 securely mounted upon the main shaft 23. Thus the movable blade will be actuated once during each rotation of the main shaft. The vertical rod 69 is further provided with a fixed collar 72 adapted to seat upon the surface 73 of the frame work of the machine in which there is a hole 74 to receive and guide the lower end of the rod 69. The collar 72 upon the rod limits the downward movement thereof so that the projecting lugs 70 will normally be in proper position to be engaged periodically by the cam 71. The upward thrust of the movable knife blade 68 is limited by a suitable buffer 75 attached to the fixed blade. After the cam 71 has actuated the rod 69, the latter resumes its normal position by force of gravity and the movable blade 68 acts similarly. It will be understood that the operation of the parts is such that where the knife is actuated, the feed rollers will have a non-feeding relation to the knife. For this purpose the parts may be so related that the said rollers will be thrown out of gear at a certain point in each rotation of the main shaft, this point being marked by the engagement of the pawl 40 with the fixed stop 43 as previously described. Obviously the movable knife may be made to operate immediately after the pawl 40 has thus been disconnected from the ratchet wheel 41 by positioning the cam 71 on the main shaft so that the said cam will actuate the knife operating mechanism just after the pawl carrying arm 39 passes the fixed trip 43.

As pointed out heretofore, the moistening apparatus of the present device is preferably arranged to operate in synchronism with the tape feeding mechanism. The leading end of the tape after passing the rolls and the stationary knife 67 is guided so as to contact with the peripheral surface of a moistening roller 76 It is contemplated that when gummed tape is used, the moistening rollers are rotated in a supply of water, a film of which adheres upon its peripheral surface to moisten the gum on the tape. It may be, however, that ungummed tape may be fed through the machine, in which case the rotating moistener will be made to rotate in a supply of adhesive material. In order that the roller 76 may rotate in synchronism with the feeding rollers 31 and 32, it is suitably connected with the main gear 37 by means of intermediate gears 77 and 78 so proportioned as to impart the proper speed to the moistening roller.

In a machine designed to operate rapidly, it is essential that the tape should be guided accurately to the moistening roller. By locating the moistener relatively close to the tape feeding roller, and by providing a guide bar 34 heretofore referred to, the free end of the tape is made to register with the exposed surface of the moistening roller upon which it is carried toward a presser roller 79. I prefer to make the moistening roller of comparatively large diameter so that the oncoming tape end may meet the rotating surface of the roller at a proper angle to be readily carried therewith. I also find it advantageous to mount the moistening roller in the moisture carrying receptacle so that only a small part of its peripheral surface is exposed. According to Fig. 3, the relatively large moistening roller 80 rotates in a tank 81 partially filled with water, or some other moistening medium. The walls of this tank extend upwardly so as to substantially inclose the moistening roller except for a comparatively small surface upon which the tape is moistened. The moistening roller, which is preferably made of an impervious material having a roughened peripheral surface (Fig. 2) in order that it may carry up sufficient water for moistening the tape, is provided with a plurality of peripheral grooves 82 (Fig. 2). At the front of the moistening tank, I have located a bar 83 provided with a plurality of prongs 84, adapted to engage the grooves 82 in the roller. These prongs and the bar act as strippers to prevent the end of the tape from adhering to the moistening roller. Immediately above the said moistening roller, are presser rollers 79 and 85, (Figs. 2 and 3), provided with peripheral projections and held in spring pressed engagement with the peripheral surface of the moistening roller. Intermediate these presser rollers, is a transverse bar 86 carrying a plurality of spaced projecting members 87 extending downwardly toward the moistening roller and so positioned with respect to the two presser rollers and the moistening roller as to guide the free end of the tape under the second presser roller 85. It has been found in connection with the operation of automatic power driven machines that the swiftly rotating moistener carries with it a superfluous amount of water, thereby tending to flood the tape and to hinder efficient operation of the machine. To prevent this, I have placed a freely rotating roller 88 between the moistening roller and the rear of the tank in such a manner that it is supported wholly by these two members and therefore bears against them with a pressure varying according to its weight. This roller bearing in this manner against the moisture carrying surface of the moistener as it emerges from the water supply, intercepts the superfluous water and permits only a comparatively thin film of moisture to adhere to the moistening roller. In order that the tape may be thoroughly moistened in spite of the thinness of the film of water, I have provided the two presser rollers described above to hold the tape in firm contact with the moistening roller over a substantial portion of the peripheral surface thereof, thus allowing sufficient exposure of the gum to the moistener to insure its thorough impregnation.

In connection with the moistening apparatus, I have also provided further means whereby the adhesive condition of the gum may be secured more quickly and more effectively than heretofore. In the case of inferior gums and under some climatic conditions, it may be found that the gum on the tape will not become thoroughly impregnated with the moistening agent. By applying heat in a suitable manner, the gum may be dissolved more rapidly than is usually the case where moistening is attempted at low temperatures. For this purpose I provide means for heating the water contained in the moistening tank, Fig. 3, here shown as a gas burner 91, with a suitably located shut off valve 92. In the event that ungummed tape is used in the device, then said burner or heating means would serve to reduce an adhesive substance to the proper consistency and maintain the same for any desired length of time, so as to be applied to the tape to render it properly adhesive.

I claim as my invention:

1. In a device for automatically moistening and serving strips of adhesive tape, the combination of a holder for a supply of tape, feeding means for feeding strips of predetermined length, severing means adapted to cut the tape while the feeding means are arrested, moistening means for rendering the strips adhesive, a main shaft having connections for positively operating the feeding, severing and moistening means, means for varying the speed of said feeding, severing and moistening means including a driving shaft, a friction disk operatively connected with the main shaft, and a friction gear mounted on the driving shaft to engage the face of said disk and movable along the said driving shaft radially with respect to said disk to vary the speed thereof.

2. In a device for automatically moistening and serving strips of adhesive tape, the combination of a holder for a supply of tape, feeding means for feeding strips of predetermined length, severing means adapted to cut the tape while the feeding means are arrested, moistening means for rendering the strips adhesive, a main shaft having connections for positively operating the feeding, severing and moistening means, a variable speed friction drive including a driving shaft and a friction disk having a plurality of recesses, a disk clutch operatively connected with the main shaft and adjacent to the said friction disk and said recesses, a pin mounted on the disk clutch and normally held in spring pressed engagement with one of the recesses in the friction disk, and means for withdrawing the said pin from engagement with the friction disk.

3. In a device for automatically moistening and serving strips of adhesive tape, the combination of a holder for a supply of tape, a shaft operative continuously, a collar loosely mounted on said shaft and carrying a gear and a ratchet wheel, an arm fastened to said shaft and rotatable therewith, the said arm being provided with a pawl to engage the ratchet wheel, means disposed in the path of the arm to alternately trip and set the pawl, feed rollers operatively connected with the aforesaid gear and adapted to be rotated thereby when the pawl is in engagement with the ratchet and to be arrested after the pawl has been disengaged therefrom, means for severering the strip when the feed rollers are arrested, and means for rendering the strips adhesive.

4. In a device for automatically moistening and serving strips of adhesive tape, the combination of a holder for a supply of tape, feeding means for feeding strips of predetermined length, an adjustable trip operatively connected with the feeding means to cause the latter to operate, movable stops adjustable in the path of the trip to limit its movement, severing means adapted to cut the tape while the feeding means is arrested, and moistening means for rendering the strips adhesive.

5. In a device for automatically moistening and serving strips of adhesive tape, the combination of a holder for a supply of tape, feeding means for feeding strips of predetermined length, severing means for cutting the tape, a moistening roller having an impervious surface, presser rollers arranged to contact with the moistening roller, and guiding means between the presser rollers to direct the free end of the tape under each succeeding roller.

6. In a device for serving strips of adhesive tape, the combination of a holder for a supply of tape, and moistening means comprising a roller mounted to rotate in a supply of water, and a relatively small roller supported by and in contact with the peripheral surface of the moistening roller to press excess moisture from the exposed portion thereof.

7. In a device for automatically moistening and serving strips of adhesive tape, the combination of a holder for a supply of tape, feeding means for feeding strips of predetermined length, severing means adapted to cut the tape while the feeding means are arrested, moistening means for rendering the strips adhesive, a main shaft having connections for positively operating the feeding, severing and moistening means, a variable speed friction drive including a driving shaft for a friction disk, and means for actuating and arresting the main shaft during continuous operation of the driving shaft.

8. In a device for automatically moistening and serving strips of adhesive tape, the combination of a holder for a supply of tape, feeding means for feeding strips of predetermined length, severing means adapted to cut the tape while the feeding means are arrested, moistening means for rendering the strips adhesive, a main shaft having connections for positively operating the feeding, severing and moistening means, a variable speed friction drive including a driving shaft for a friction disk, and means for actuating and arresting the main shaft during continuous operation of the driving shaft including a main shaft driving member and means for releasably connecting said member and the friction disk.

9. In a strip serving device, the combination of a holder for a supply of tape, means adapted to positively feed tape strips of predeterminable length, and means for varying the length of strips fed, during operation of the feeding means.

10. In a strip serving device, the combination of a holder for a supply of tape, means adapted to positively feed tape strips of predeterminable length, and means adjustable during operation of the feeding means for controlling said strip feeding means whereby strips of different lengths may be fed alternately by adjusting said controlling means during the feeding operation.

11. In a strip serving device, the combination of a holder for a supply of tape, means adapted to positively feed tape strips of predeterminable length, and means for controlling said strip feeding means to feed strips of various lengths comprising a strip feed actuating member, a strip feed arresting member, and means for shifting the position of the latter member to effect a change of strip length during normal operation of the strip feeding means.

12. In a strip serving device, the combination of a holder for a supply of tape, means adapted to positively feed tape strips of predeterminable length, means to delimit the operating period of said feeding means, and means for adjusting said delimiting means for any given strip length during the feeding of the preceding strip.

13. In a strip serving device, the combination of a holder for a supply of tape, means adapted to positively feed tape strips of predeterminable length, means to delimit the operating period of said feeding means, and strip length indicating means coöperating with said delimiting means.

14. In a strip serving device, the combination of a holder for a supply of tape, means adapted to positively feed tape strips of predeterminable length, means to delimit the operating period of said feeding means, strip length indicating means coöperating with said delimiting means, and a stop member adjustable in the path of said delimiting means.

15. In a device for serving strips of adhesive tape, the combination of a holder for a supply of tape, and moistening means comprising a roller mounted to rotate in a container of moistening liquid, and a second roller lying between said first roller and a wall of the container and adapted to press excess moisture from the exposed portion thereof.

16. In a device for serving strips of adhesive tape, the combination of a holder for a supply of tape, and moistening means comprising a positively driven roller mounted to rotate in a container of moistening liquid, and a relatively small roller lying between said first roller and a wall of the container and overlying a portion of said moistening roller and in rolling contact therewith to press excessive moisture from the exposed portion of the peripheral surface of the moistener.

17. In a device for automatically moistening and serving strips of adhesive tape, the combination of a holder for a supply of tape, feeding means for feeding strips of predetermined length, moistening means for rendering the strips adhesive, a main shaft having connections for positively operating the feeding and moistening means, a variable speed friction drive including a driving shaft for a friction disk, and means for actuating and arresting the main shaft during continuous operation of the driving shaft.

18. In a device for automatically moistening and serving strips of adhesive tape, the combination of a holder for a supply of tape, feeding means for feeding strips of predetermined length, moistening means for rendering the strips adhesive, a main shaft having connections for positively operating the feeding and moistening means, a variable speed friction drive including a driving shaft for a friction disk, and means for actuating and arresting the main shaft during continuous operation of the driving shaft including a main shaft driving member and means for releasably connecting said member and the friction disk.

In testimony whereof, I have signed my name to this specification, in the presence of two subscribing witnesses, this 7th day of May, 1914.

CHARLES G. MORTIMER.

Witnesses:
MANVEL WHITTEMORE,
JOHN W. THOMPSON.